United States Patent
Clark et al.

(10) Patent No.: US 10,507,755 B1
(45) Date of Patent: Dec. 17, 2019

(54) MODULAR RECREATION VEHICLE

(71) Applicants: Robert Clark, Tucson, AZ (US);
Rebecca White, Tucson, AZ (US)

(72) Inventors: Robert Clark, Tucson, AZ (US);
Rebecca White, Tucson, AZ (US)

(*) Notice: Subject to any disclaimer, the term of this patent is extended or adjusted under 35 U.S.C. 154(b) by 120 days.

(21) Appl. No.: 15/838,533

(22) Filed: Dec. 12, 2017

(51) Int. Cl.
*B60P 3/32* (2006.01)
*B60R 15/04* (2006.01)
*B60R 15/02* (2006.01)

(52) U.S. Cl.
CPC .......... *B60P 3/32* (2013.01); *B60R 15/02* (2013.01); *B60R 15/04* (2013.01)

(58) Field of Classification Search
CPC ...... B60P 3/39; B60P 3/36; B60P 3/32; B60P 3/34; B60P 3/07; B60P 1/02; B60P 3/42; B60P 3/08; B60P 3/341; B60P 1/435; B60P 3/14
USPC ... 296/156, 164, 168, 173, 26.13, 69, 65.01, 296/64, 174, 210, 61; 49/501, 503, 139, 49/163, 168, 169, 70, 504
See application file for complete search history.

(56) References Cited

U.S. PATENT DOCUMENTS

| | | | |
|---|---|---|---|
| 4,550,946 A * | 11/1985 | Hanemaayer | B60P 3/36 105/319 |
| 5,031,249 A | 7/1991 | Sargent | |
| 5,967,583 A | 10/1999 | Wishart | |
| D419,921 S | 2/2000 | Mishler | |
| 6,135,532 A * | 10/2000 | Martin | B60P 1/435 14/71.1 |
| 6,378,927 B1 * | 4/2002 | Parry-Jones | B60P 1/435 296/61 |
| 6,616,396 B2 | 9/2003 | Sternberg | |
| 8,864,206 B2 | 10/2014 | Miller | |
| 8,911,196 B2 * | 12/2014 | Cazes | B60P 3/07 296/158 |
| 9,070,298 B2 | 6/2015 | Kiridena | |
| 9,498,078 B2 * | 11/2016 | Boyd | A47G 33/00 |
| 2002/0081184 A1 * | 6/2002 | Sternberg | B60P 1/431 414/537 |
| 2004/0017096 A1 | 3/2004 | Crean | |
| 2014/0208498 A1 | 7/2014 | Beach | |

FOREIGN PATENT DOCUMENTS

EP 20931303 A1 8/2009

* cited by examiner

*Primary Examiner* — D Glenn Dayoan
*Assistant Examiner* — Sunsurraye Westbrook
(74) *Attorney, Agent, or Firm* — Kyle A. Fletcher, Esq.

(57) ABSTRACT

The modular recreation vehicle is a vehicle with a modular storage capacity that is configured for use during recreational activities. The modular recreation vehicle comprises a domestic space that within which sanitary and cooking facilities are installed. The modular recreation vehicle further comprises a plurality of anchor tracks which may be used to install in a removable fashion domestic items such as furniture items for relaxation or storage purposes.

19 Claims, 7 Drawing Sheets

MODULAR RECREATION VEHICLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transporting including vehicles adapted to transport special loads, more specifically, a vehicle used as living accommodations capable of rearrangement.

SUMMARY OF INVENTION

The modular recreation vehicle is a vehicle with a modular storage capacity that is configured for use during recreational activities. The modular recreation vehicle comprises a domestic space that within which sanitary and cooking facilities are installed. The modular recreation vehicle further comprises a plurality of anchor tracks, which may be used to install in a removable fashion domestic items such as furniture items for relaxation or storage purposes.

These together with additional objects, features and advantages of the modular recreation vehicle will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular recreation vehicle in detail, it is to be understood that the modular recreation vehicle is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular recreation vehicle.

It is therefore important that the claims be regarded as including such equivalent construction insofar as they do not depart from the spirit and scope of the modular recreation vehicle. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
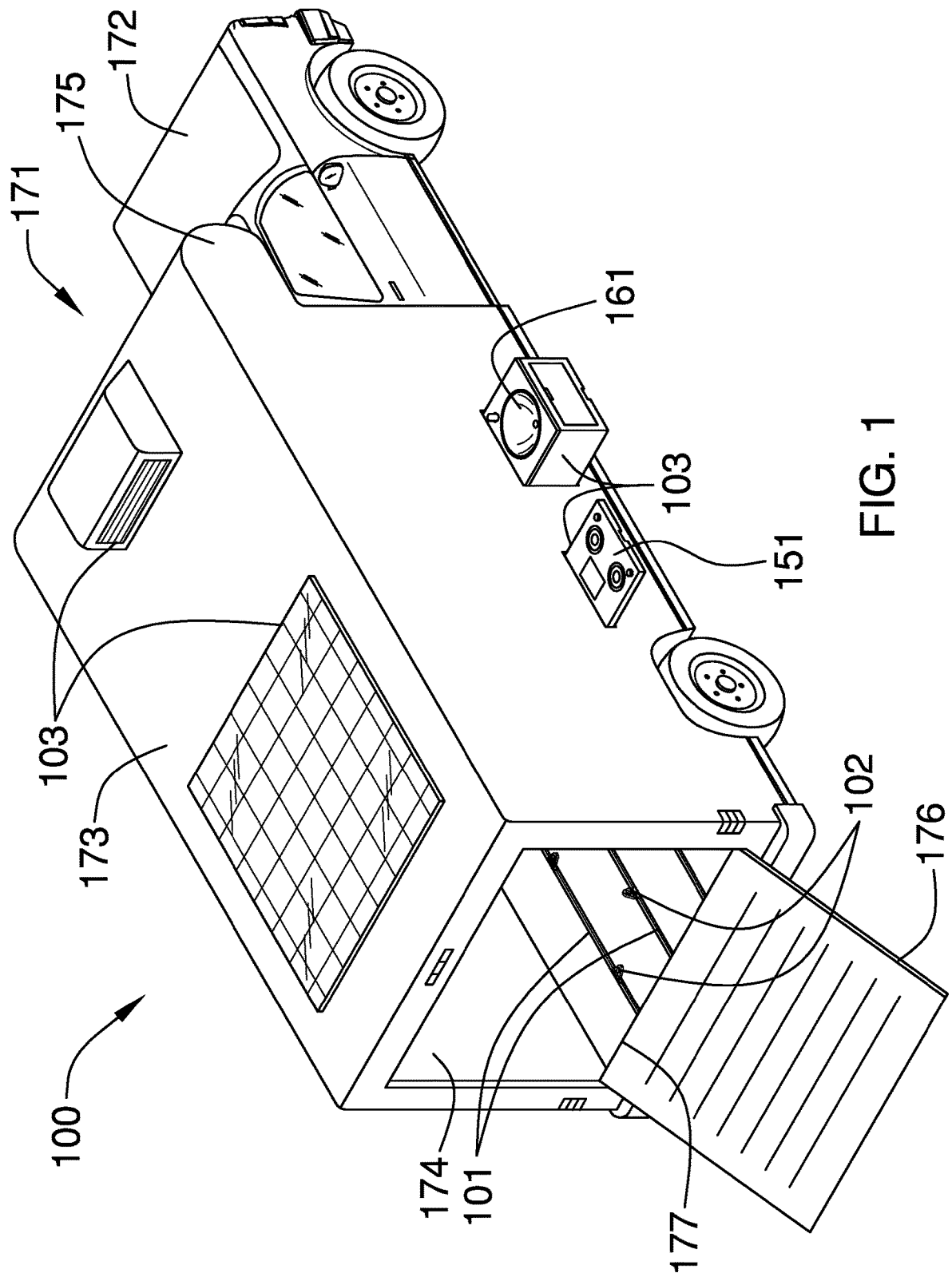
FIG. 1 is a perspective view of an embodiment of the disclosure.
Figure 2:
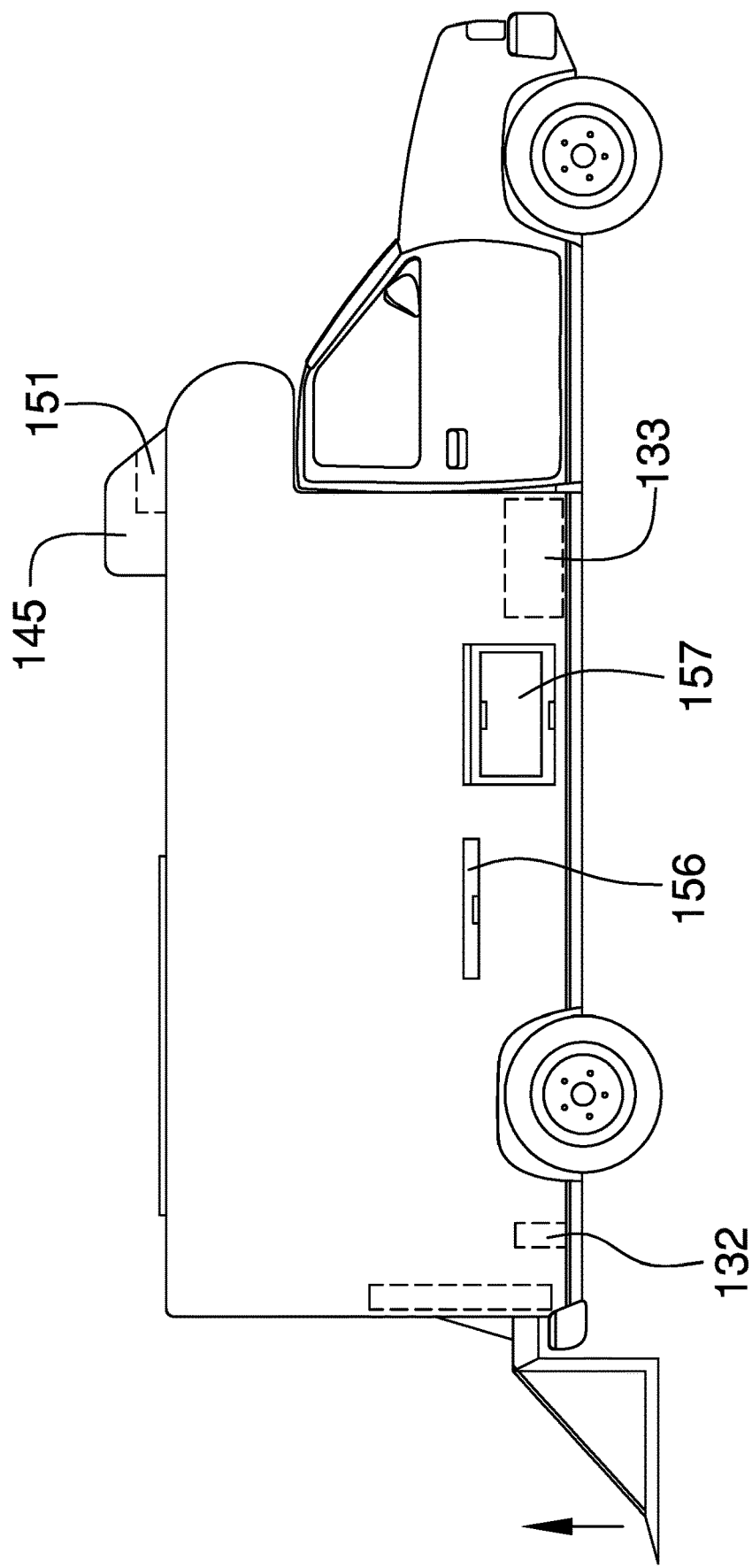
FIG. 2 is a side view of an embodiment of the disclosure.
Figure 3:
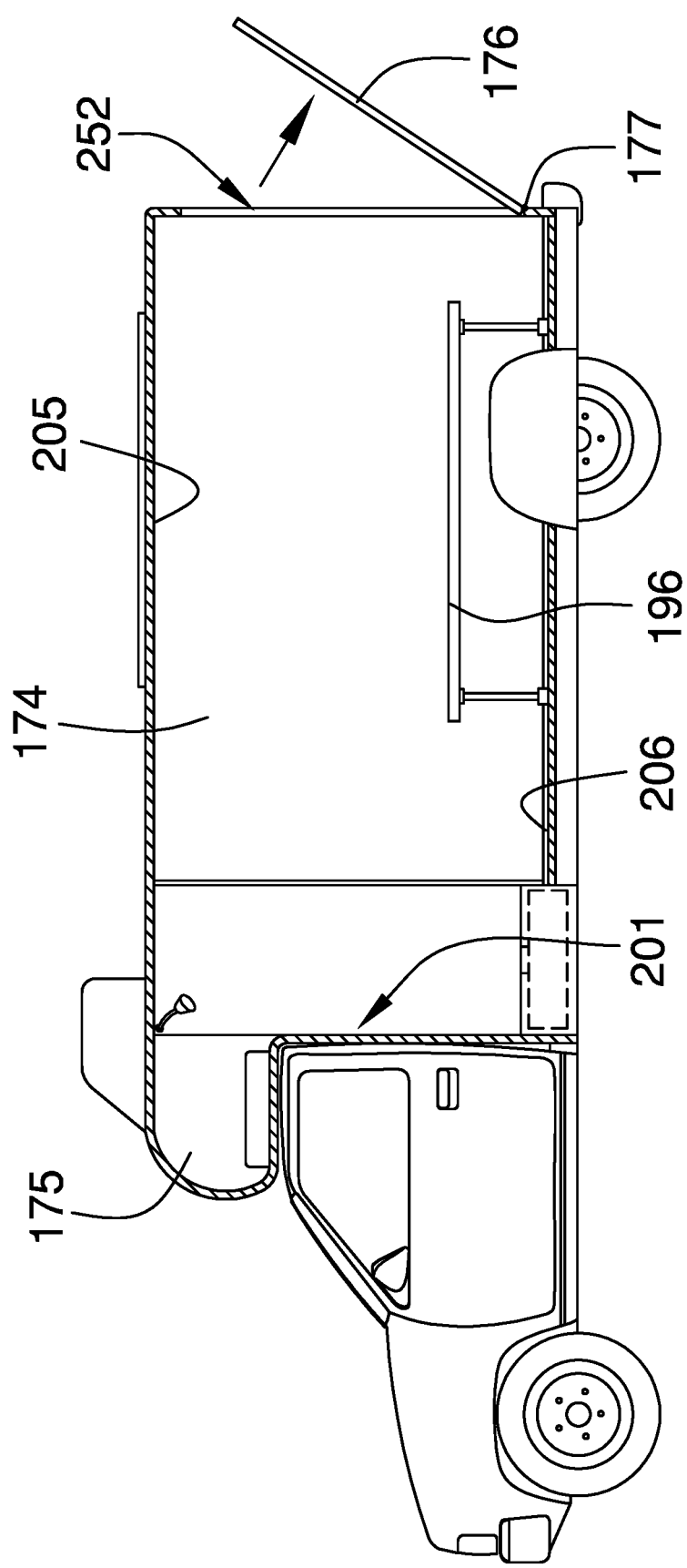
FIG. 3 is a reverse side cross-sectional view of an embodiment of the disclosure.
Figure 4:
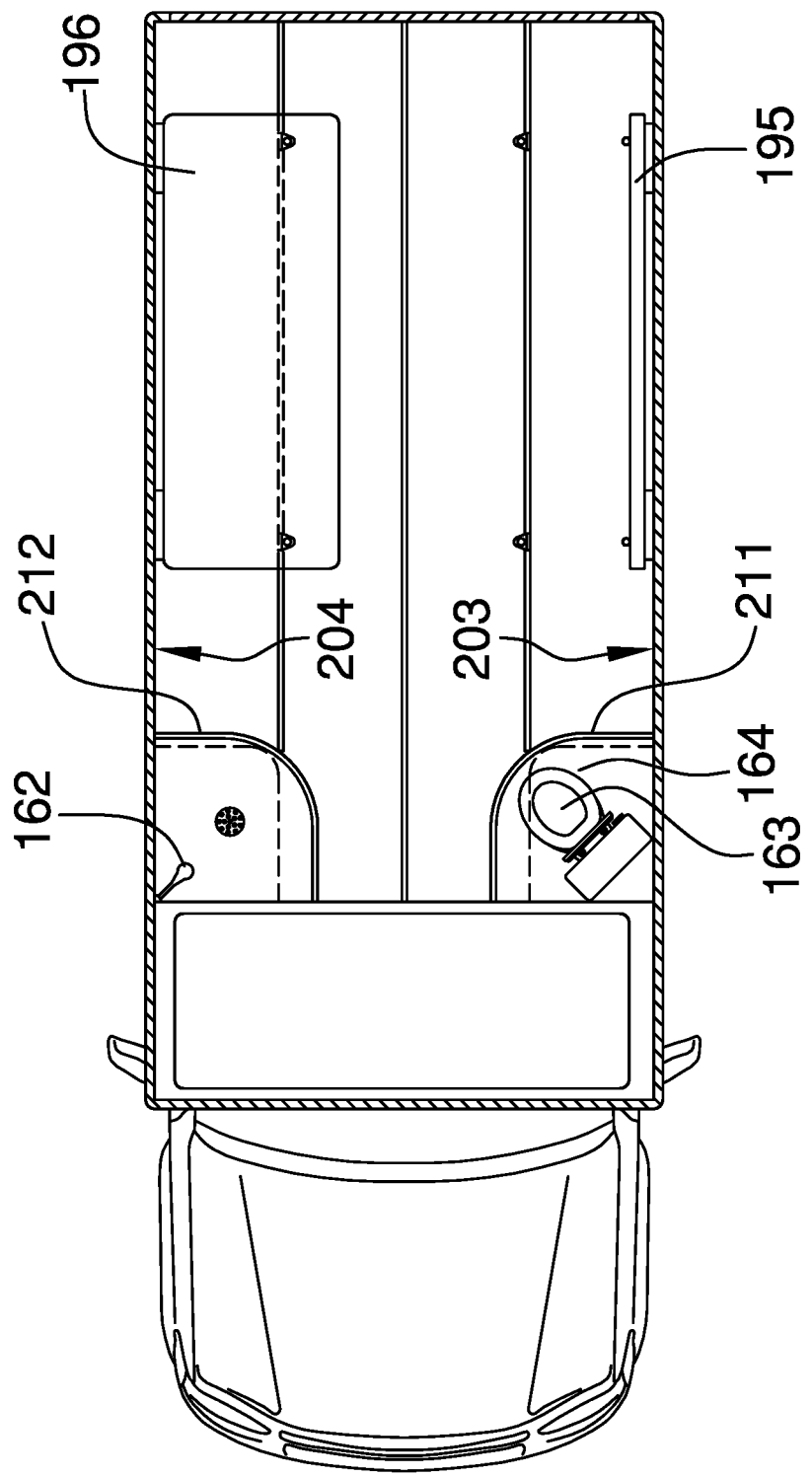
FIG. 4 is a top view of an embodiment of the disclosure.
Figure 5:
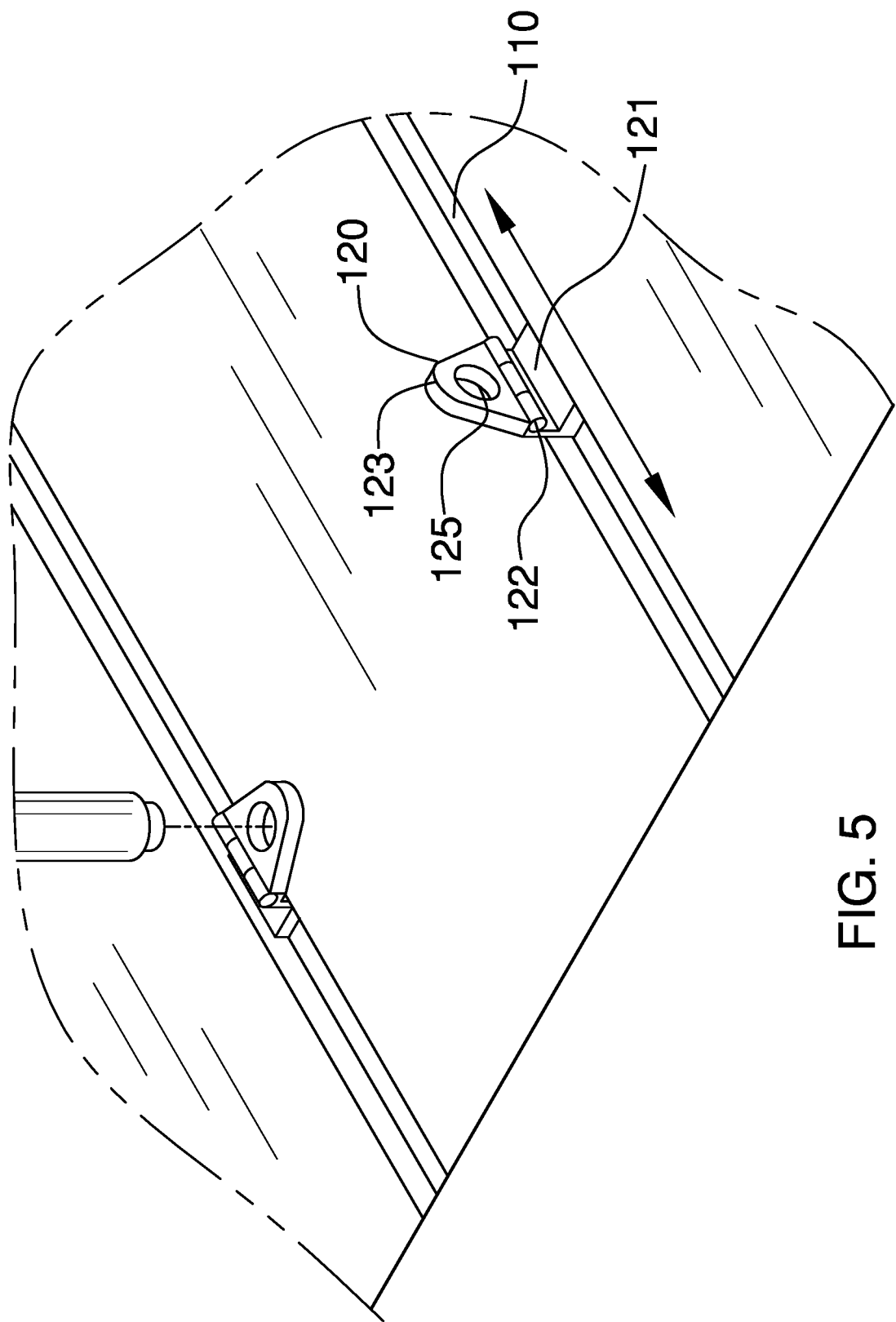
FIG. 5 is a detail view of an embodiment of the disclosure.
Figure 6:
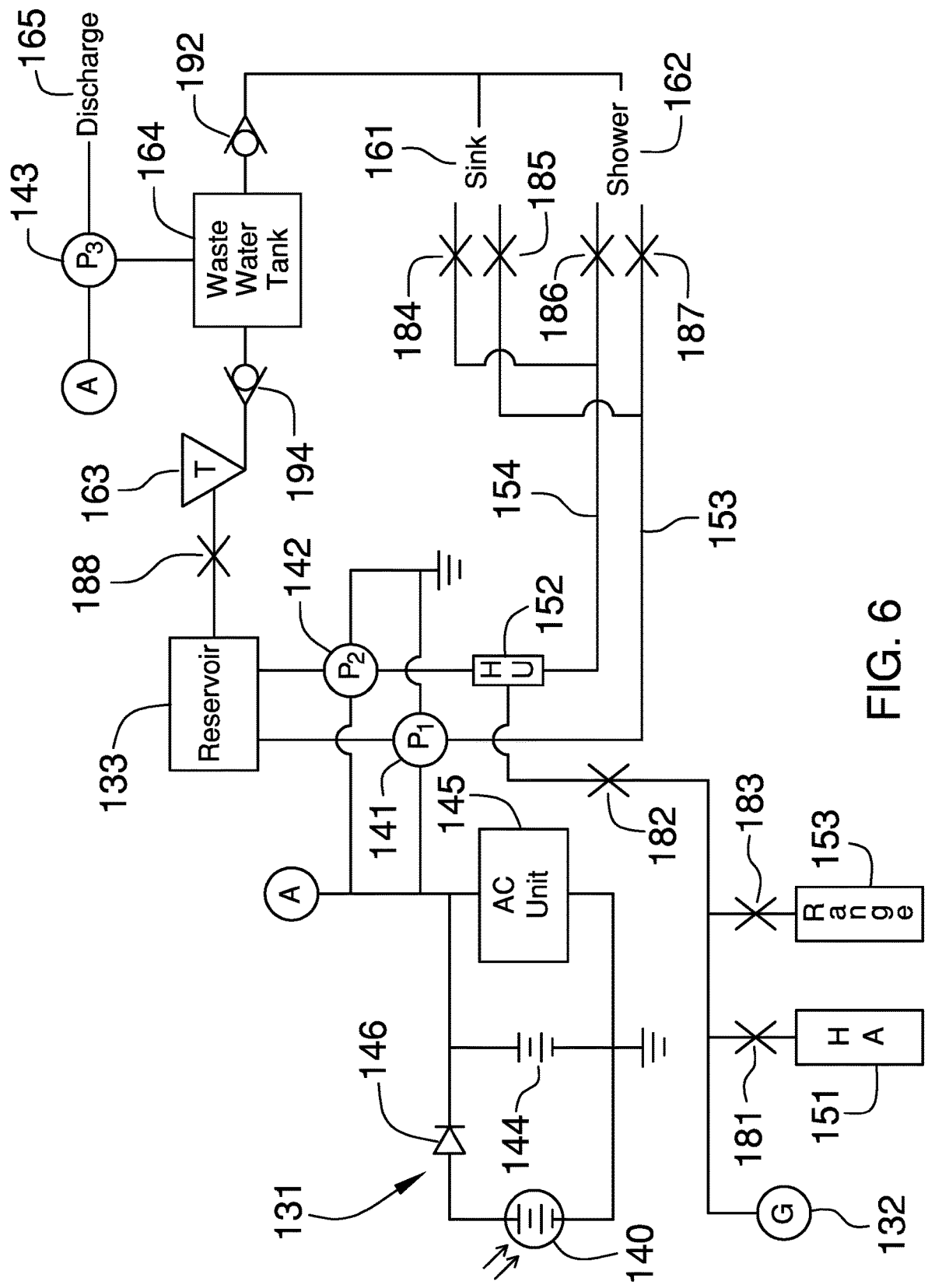
FIG. 6 is a schematic view of an embodiment of the disclosure.
Figure 7:
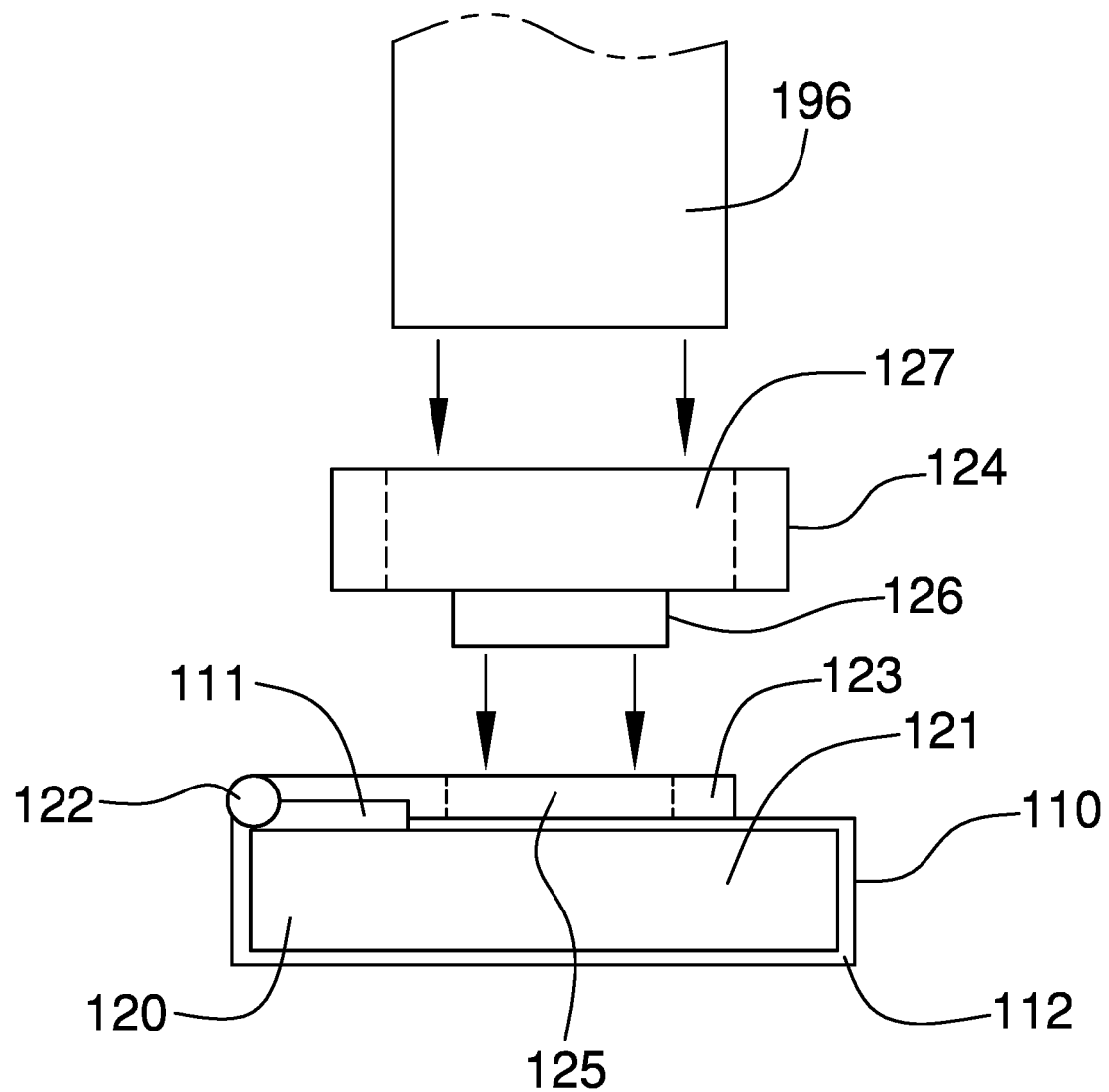
FIG. 7 is a detail view of an embodiment of the disclosure.

Detailed reference will now be made to one or more potential embodiments of the disclosure, which are illustrated in FIGS. 1 through 7.

The modular recreation vehicle 100 (hereinafter invention) is a vehicle 171 with a modular storage capacity that is configured for use during recreational activities. The invention 100 comprises a domestic space that within which sanitary and cooking facilities are installed. The invention 100 further comprises a plurality of anchor tracks 101 which may be used to install in a removable fashion domestic items such as furniture items for relaxation or storage purposes.

The vehicle 171 refers to the physical structure upon which the invention 100 is based. The vehicle 171 comprises a cab and chassis 172 and a domestic space 173. The cab and chassis 172 refers to the physical components of the vehicle 171 that provide for the mobility of the invention 100. The domestic space 173 refers to a hollow shell attached to the cab and chassis 172, which forms a sheltered structured intended to support the recreational activities supported by the invention 100. A passageway is formed that allows for movement between the domestic space 173 and the cab and chassis 172. The domestic space 173 further comprises a domestic chamber 174, an attic 175, and a ramp 176. The ramp 176 further comprises a ramp hinge 177. The domestic chamber 174 refers to the hollow interior space of the domestic space 173. The domestic chamber 174 is further defined with a front interior surface 201, a rear interior surface 202, a left interior surface 203, a right interior surface 204, a superior interior surface 205, and an inferior interior surface 206.

The attic 175 is a small rounded rectilinear negative space that opens into the domestic chamber 174 where the front interior surface 201 and the superior interior surface 205 are joined. The attic 175 is positioned above the cab of the cab and chassis 172. The ramp 176 forms the rear interior surface 202 of the domestic chamber 174. The ramp hinge 177 attaches the ramp 176 to the domestic space 173 such that the ramp 176 rotates relative to the domestic space 173 at the inferior interior surface 206. The ramp 176 forms a load bearing inclined surface that allows for loading and unloading of equipment and domestic articles into the invention 100.

The invention 100 comprises a plurality of anchor tracks 101, a plurality of anchors 102, and an infrastructure 103.

Each of the plurality of anchor tracks 101 is a slot 111 that is formed in an interior surface selected from the group consisting of the front interior surface 201, the rear interior surface 202, the left interior surface 203, the right interior surface 204, the superior interior surface 205, and the inferior interior surface 206. Each of the plurality of anchor tracks 101 is used to removably secure a domestic article to a surface within the domestic chamber 174 of the vehicle 171.

Typical domestic articles would include, but are not limited to, a folding cot 195 or a folding table 196. The folding cot 195 is a bedding structure that is attached to an interior surface selected from the group consisting of the front interior surface 201, the rear interior surface 202, the left interior surface 203, and the right interior surface 204. The folding table 196 is a horizontal surface that is attached to an interior surface selected from the group consisting of the front interior surface 201, the rear interior surface 202, the left interior surface 203, the right interior surface 204, and the inferior interior surface 206.

The plurality of anchor tracks 101 comprises a collection of individual anchor tracks 110. Each individual anchor track comprises a slot 111 and a channel 112. The individual anchor track 110 refers to an individual anchor track 110 selected from the plurality of anchor tracks 101. The individual anchor track 110 forms a negative space within the selected interior surface. The slot 111 is an opening formed within the selected interior surface that permits access into the individual anchor track 110 through the selected inferior surface. The slot 111 is formed within the selected interior surface of the domestic chamber 174. The channel 112 refers to an enclosed portion of the slot 111. By enclosed is meant that the channel 112 forms a hollow space underneath the selected interior surface. Each individual anchor track 110 is sized to receive one or more individual anchors 120 selected from the plurality of anchors 102.

Each of the plurality of anchors 102 is a mechanical fastening device that attaches a domestic article to an individual anchor track 110 selected from the plurality of anchor tracks 101. The plurality of anchors 102 comprises a collection of individual anchors 120. Each individual anchor 120 is a mechanical device that fastens a domestic article to an individual anchor track 110 selected from the plurality of anchor tracks 101. Each individual anchor 120 comprises a rail 121, a hinge 122, an anchor plate 123, and a cap 124.

The rail 121 is a plate that is sized such that the rail 121 can be inserted into the individual anchor track 110. The hinge 122 attaches the anchor plate 123 to the rail 121 such that the anchor plate 123 can rotate relative to the rail 121. The anchor plate 123 is a plate that is positioned outside the individual anchor track 110 within which the rail 121 is inserted. The anchor plate 123 forms the anchor point to which the cap 124 is attached. The cap 124 is a mechanical device that: 1) attaches to the domestic article; and, 2) attaches to the anchor plate 123 for the purpose of securing the domestic article to the selected interior surface of the domestic chamber 174.

The anchor plate 123 further comprises an anchor mortise 125. The anchor mortise 125 is a radial hole that is formed through the anchor plate 123.

The cap 124 further comprises a cap tenon 126 and a cap mortise 127. The cap tenon 126 is a cylindrical tenon that is formed on the cap 124. The cap tenon 126 is sized such that the cap tenon 126 can be inserted into the anchor mortise 125. The cap tenon 126 is physically inserted into the anchor mortise 125 to attach the cap 124 to the individual anchor 120. The cap mortise 127 is a cylindrical cavity that is formed within the cap 124. The cap mortise 127 is sized to receive the portion of the domestic article that will be attached to the individual anchor 120.

The infrastructure 103 refers to a collection of apparatus that provide access to basic necessities while the invention 100 is in use. The infrastructure 103 comprises an electrical system 131, a gas tank 132, and a reservoir 133.

The electrical system 131 refers to a collection of electrical devices that are incorporated into the infrastructure 103 of the invention 100. The electrical system 131 comprises a first pump 141, a second pump 142, a third pump 143, a battery 144, an AC unit 145, and a diode 146.

The photovoltaic cell 140 refers to one or more electrical devices that directly convert light energy into electrical energy. The photovoltaic cell 140 will be referred to as a single device with the understanding that a plurality of individual photovoltaic cells 140 may be ganged together to generate the electrical power deemed necessary to support the needs of the invention 100.

The first pump 141 is an electrically powered pump. The first pump 141 pumps water from the reservoir 133 through the cold line 155 to the fourth valve 184 of the sink 161 and the seventh valve 187 of the shower 162. The second pump 142 is an electrically powered pump. The second pump 142 pumps water from the reservoir 133 through the water heater 152 into the hot line 154, which delivers the heated water to the fifth valve 185 of the sink 161 and the sixth valve 186 of the shower 162. The third pump 143 is an electrically powered pump. The third pump 143 disposes of waste water that has accumulated in the waste water tank 164. The third pump 143 pumps waste water from the waste water tank 164 through the discharge 165 for disposal.

The battery 144 is a commercially available rechargeable battery 144. The chemical energy stored within the battery 144 is renewed and restored through use of the photovoltaic cell 140. The photovoltaic cell 140 forms an electrical circuit that reverses the polarity of the battery 144 and provides the energy necessary to reverse the chemical processes that the battery 144 initially used to generate electrical energy. This reversal of the chemical process creates a chemical potential energy that will later be used to generate electricity. The diode 146 comprises one or more electrical devices that allow current to flow in only one direction. The diode 146 is installed between the battery 144 and the photovoltaic cell 140 such that electricity will not flow from the positive terminal of the battery 144 to the positive terminal of the photovoltaic cell 140.

The AC unit 145 is an electrically powered device that is mounted on the superior surface of the vehicle 171. The AC unit 145 cools the domestic chamber 174 of the vehicle 171. Within this disclosure, AC is an acronym for air conditioning.

The gas tank 132 refers to a tank and a collection of gas-powered devices that are incorporated into the infrastructure 103 of the invention 100. The gas tank 132 is associated with an air heater 151, a water heater 152, and a range 153.

The air heater 151 is a combustion heater that burns gas stored within the gas tank 132 to heat the domestic chamber 174 of the vehicle 171. The air heater 151 is mounted on the superior surface of the vehicle 171. The air heater 151 further comprises a first valve 181. The first valve 181 is a valve that controls the flow of gas into the air heater 151.

The water heater 152 is a combustion heater that burns gas stored within the gas tank 132 to heat water that is drawn from the reservoir 133. The water heater 152 further comprises a second valve 182. The second valve 182 is a valve that controls the flow of gas into the water heater 152.

The range 153 is a combustion heater that is used to cook food. The range 153 is stored within a first drawer 156 such that the range 153 may be accessed form the exterior of the domestic space 173. The range 153 further comprises a third valve 183 and the first drawer 156. The first drawer 156 is a commercially available drawer that contains the range 153. The third valve 183 is a valve that controls the flow of gas into the range 153.

The reservoir 133 refers to a water storage and distribution system that is incorporated into the infrastructure 103 of the invention 100. The reservoir 133 comprises a hot line 154 and a cold line 155. The reservoir 133 is associated with a sink 161, a shower 162, a toilet 163, and a waste water tank 164. The hot line 154 refers to a piping network that distributes water from the water heater 152 to the sink 161 and the shower 162. The cold line 155 refers to a piping network that distributes water from the reservoir 133 to the sink 161, the shower 162, and the toilet 163.

The sink 161 is a basin into which water may be drawn from the reservoir 133 for a variety of domestic purposes. The sink 161 further comprises a fourth valve 184, a fifth valve 185, and a second drawer 157. The second drawer 157 is a commercially available drawer that contains the sink 161. Methods to form and install drawers as described in this disclosure are well known in the mechanical arts. The fourth valve 184 is a valve that controls the flow of water from the water heater 152 into the sink 161. The fifth valve 185 is a valve that controls the flow of water from the reservoir 133 into the sink 161.

The shower 162 is a dedicated space within the domestic chamber 174: 1) through which water from the reservoir 133 may be accessed; 2) through which water from the water heater 152 may be accessed; and, 3) which is suitably appointed for bathing purposes. The shower 162 further comprises a sixth valve 186 and a seventh valve 187. The sixth valve 186 is a valve that controls the flow of water from the water heater 152 into the shower 162. The seventh valve 187 is a valve that controls the flow of water from the reservoir 133 into the shower 162. In the first potential embodiment of the disclosure, the shower 162 is enclosed with a second partition 212. The second partition 212 is a vertical barrier that: 1) contains water within the space surrounding the shower 162; and, 2) provides the space surrounding the shower 162 with privacy.

The toilet 163 is a commercially available receptacle into which biological excretions and eliminations may be deposited. The toilet 163 further comprises an eighth valve 188. The eighth valve 188 is a valve that controls the flow of water from the reservoir 133 into the toilet 163. In the first potential embodiment of the disclosure, the toilet 163 further comprises accommodations for the storage of toilet paper and hand sanitizer. In the first potential embodiment of the disclosure, the toilet 163 is enclosed with a first partition 211. The first partition 211 is a vertical barrier that provides the space surrounding the toilet 163 with privacy.

The waste water tank 164 is a storage container within which is stored waste water generated by the sink 161, the shower 162, and the toilet 163. The waste water tank 164 further comprises a discharge 165, a first check valve 191 and a second check valve 192. The discharge 165 is a port through which waste water collected within the waste water tank 164 is removed. The first check valve 191 is a valve that prevents the backflow of water from the waste water tank 164 into the toilet 163. The second check valve 192 is a valve that prevents the backflow of water from the waste water tank 164 into both the sink 161 and the shower 162.

The following definitions and directional references were used in this disclosure:

Anchor: As used in this disclosure, anchor means to hold an object firmly or securely.

Anchor Point: As used in this disclosure, an anchor point is a location to which a first object can be securely attached to a second object.

Battery: As used in this disclosure, a battery is a container consisting of one or more cells, in which chemical energy is converted into electricity and used as a source of power.

Cavity: As used in this disclosure, a cavity is an empty space or negative space that is formed within an object.

Channel: As used in this disclosure, a channel is a tubular passage through which an object or fluid is passed through.

Check Valve: As used in this disclosure, a check valve is a valve that permits the flow of fluid or gas in a single direction. Within selected potential embodiments of this disclosure, the check valve is a commercially available ball valve.

Diode: As used in this disclosure, a diode is a two terminal semiconductor device that allows current flow in only one direction. The two terminals are called the anode and the cathode. Electric current is allowed to pass from the anode to the cathode.

Domestic Article: As used in this disclosure, a domestic article is an item or object that is commonly found within a household.

Drawer: As used in this disclosure, a drawer is a storage compartment that is designed to slide into and out of a larger object.

Exterior: As used in this disclosure, the exterior is use as a relational term that implies that an object is not contained within the boundary of a structure or a space.

Hinge: As used in this disclosure, a hinge is a device that permits the turning, rotating, or pivoting of a first object relative to a second object.

Inferior: As used in this disclosure, the term inferior refers to a directional reference that is parallel to and in the same direction as the force of gravity.

Interior: As used in this disclosure, the interior is use as a relational term that implies that an object is contained within the boundary of a structure or a space.

Load: As used in this disclosure, the term load refers to an object that upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Mortise: As used in this disclosure, a mortise is a cavity formed in a material that is designed to receive a similarly shaped object such that the similarly shaped object is flush to the surface of the material.

Negative Space: As used in this disclosure, negative space is a method of defining an object through the use of open or empty space as the definition of the object itself, or, through the use of open or empty space to describe the boundaries of an object.

Photovoltaic Cell: As used in this disclosure, a photovoltaic cell is an electrical device that directly converts light energy into electrical energy.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used. The center axis of a prism is defined as a line that joins the center point of the first corresponding face of the prism to the center point of the second corresponding face of the prism. The center axis of a prism is otherwise analogous the center axis of a cylinder.

Pump: As used in this disclosure, a pump is a mechanical device that uses suction or pressure to raise or move fluids, compress fluids, or force a fluid into an inflatable object.

Radial hole: As used in this disclosure, a radial hole comprises a hole that is formed through a solid cylinder such that: 1) the formed hole is cylindrical; 2) the center axis of the formed hole is perpendicular to the center axis of the solid cylinder; and, 3) the center axis of the formed hole intersects the center axis of the solid cylinder. When the term radial hole is applied to a pipe, or other hollow cylindrical object, the term applies to two holes that are formed in the surface of the pipe in a manner that is consistent with the solid cylinder definition. When the term radial hole is applied to a prism formed from an N-gon when N is an even number, the assumption should be made that the center axis is formed by a line that connects the center of the first corresponding face of the prism to the center of the second corresponding face of the prism.

Rectangular Block: As used in this disclosure, a rectangular block refers to a three dimensional structure comprising six rectangular surfaces formed at right angles. Within this disclosure, a rectangular block may further comprises rounded edges and corners.

Rectilinear: As used in this disclosure, rectilinear is an adjective that is used to describe an object that: 1) moves in a straight line or lines; 2) consists of a straight line or lines; 3) is bounded by a straight line or lines; or, 4) is otherwise characterized by a straight line or lines.

Rounded: A used in this disclosure, the term rounded refers to the replacement of an apex or vertex of a structure with a (generally smooth) curvature wherein the concave portion of the curvature faces the interior or center of the structure.

Slot: As used in this disclosure, a slot is a long narrow groove or aperture that is formed in an object.

Superior: As used in this disclosure, the term superior refers to a directional reference that is parallel to and in the opposite direction of the force of gravity.

Tenon: As used in this disclosure, a tenon is a structure that projects away from an edge a first object (often the end of a piece of wood). The tenon is sized and shaped to fit into a mortise that is formed in a second object such that the first object can be attached to the second object by inserting the tenon in the matching mortise.

Track: As used in this disclosure, a track is a slot that is formed in a surface of a first object that is formed to receive a ridge formed in a second object for the purpose of fastening the second object to the first object.

Vehicle: As used in this disclosure, a vehicle is a motorized device that is used for transporting passengers, goods, or equipment. The term motorized refers to a vehicle can move under power provided by an electric motor or an internal combustion engine.

The directional references used in this disclosure correspond to the directional references from the perspective of the vehicle. The front is the side of the vehicle proximal to the normal direction of travel. The rear side is the side of the vehicle that is distal from the front. The inferior side is the side of the vehicle that is closest to the ground. The top side of the vehicle is the side of the vehicle that is distal to the bottom side. The left side is to the left side of a person facing the direction of normal, or forward travel. The right side is the side of the vehicle that is distal from the left side. In this disclosure, when the location of a first object and a second object are compared: 1) if the first object is closer to the superior side than the second object, the first object is said to be superior to the second object and the second object is said to be inferior to the first object; 2) if the first object is closer to the front side than the second object, the first object is said to be in front of the second object and the second object is said to be behind the first object; 3) if the first object is closer to the left side than the second object, the first object is said to be to the left of the second object and the second object is said to be to the right of the first object.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A recreational vehicle comprising:
   a cab and chassis and a domestic space;
   wherein the recreational vehicle is a vehicle with a modular storage capacity;
   wherein the recreational vehicle comprises a domestic space that within which sanitary and cooking facilities are installed;
   wherein the domestic space comprises a hollow shell attached to the cab and chassis;
   wherein the domestic space is a sheltered structured;
   wherein the domestic space further comprises a domestic chamber, an attic, and a ramp;
   wherein the ramp further comprises a ramp hinge;
   wherein the domestic chamber is the hollow interior space of the domestic space;
   wherein the domestic chamber is further defined with a front interior surface, a rear interior surface, a left interior surface, a right interior surface, a superior interior surface, and an inferior interior surface;
   wherein the attic is a small rounded rectilinear negative space that opens into the domestic chamber;

wherein the ramp forms the rear interior surface of the domestic chamber;
wherein the ramp hinge attaches the ramp to the domestic space such that the ramp rotates relative to the domestic space;
wherein the ramp hinge attaches the ramp to the domestic space at the inferior interior surface;
wherein the ramp is a load bearing inclined surface;
wherein the recreational vehicle further comprises a plurality of anchor tracks, a plurality of anchors, and an infrastructure;
wherein the plurality of anchor tracks and the plurality of anchors removably secures one or more domestic articles to the interior surface selected from the group consisting of the front interior surface, the rear interior surface, the left interior surface, the right interior surface, the superior interior surface, and the inferior interior surface.

2. The recreational vehicle according to claim 1 wherein each of the plurality of anchor tracks is a slot that is formed in an interior surface selected from the group consisting of the front interior surface, the rear interior surface, the left interior surface, the right interior surface, the superior interior surface, and the inferior interior surface.

3. The recreational vehicle according to claim 2
wherein the plurality of anchor tracks comprises a collection of individual anchor tracks;
wherein the individual anchor track forms a negative space within the selected interior surface.

4. The recreational vehicle according to claim 3
wherein each individual anchor track comprises a slot and a channel;
wherein the slot is an opening formed within the selected interior surface;
wherein the slot is formed within the selected interior surface of the domestic chamber;
wherein the channel comprises an enclosed portion of the slot;
wherein by enclosed is meant that the channel forms a hollow space underneath the selected interior surface.

5. The recreational vehicle according to claim 4
wherein each individual anchor track is sized to receive one or more individual anchors selected from the plurality of anchors;
wherein each of the plurality of anchors is a mechanical fastening device that attaches a domestic article selected from the one or more domestic articles to an individual anchor track selected from the plurality of anchor tracks;
wherein the plurality of anchors comprises a collection of individual anchors.

6. The recreational vehicle according to claim 5
wherein each individual anchor comprises a rail, a hinge, an anchor plate, and a cap;
wherein the hinge attaches the anchor plate to the rail;
wherein the cap attaches to the anchor plate;
wherein the cap attaches to a domestic article selected from the one or more domestic articles.

7. The recreational vehicle according to claim 6
wherein the rail is a plate that is sized such that the rail can be inserted into the individual anchor track;
wherein the hinge attaches the anchor plate to the rail such that the anchor plate can rotate relative to the rail;
wherein the anchor plate is a plate that is positioned outside the individual anchor track within which the rail is inserted.

8. The recreational vehicle according to claim 7
wherein the anchor plate further comprises an anchor mortise;
wherein the anchor mortise is a radial hole that is formed through the anchor plate;
wherein the cap further comprises a cap tenon and a cap mortise;
wherein the cap tenon is a cylindrical tenon;
wherein the cap tenon is sized such that the cap tenon can be inserted into the anchor mortise;
wherein the cap mortise is a cavity that is formed within the cap.

9. The recreational vehicle according to claim 8
wherein the infrastructure comprises an electrical system, a gas tank, and a reservoir;
wherein the electrical system, the gas tank, and the reservoir are installed within the vehicle.

10. The recreational vehicle according to claim 9
wherein the electrical system comprises a first pump, a second pump, a third pump, a battery, an AC unit, and a diode;
wherein the photovoltaic cell comprises one or more electrical devices that directly convert light energy into electrical energy;
wherein the first pump is an electrically powered pump;
wherein the second pump is an electrically powered pump;
wherein the third pump is an electrically powered pump;
wherein the battery is a rechargeable battery;
wherein the photovoltaic cell forms an electrical circuit that reverses the polarity of the battery;
wherein the diode comprises one or more electrical devices that allow current to flow in only one direction;
wherein the diode is installed between the battery and the photovoltaic cell such that electricity will not flow from the positive terminal of the battery to the positive terminal of the photovoltaic cell;
wherein the AC unit is an electrically powered device;
wherein the AC unit cools the domestic chamber of the vehicle.

11. The recreational vehicle according to claim 10
wherein the gas tank comprises a tank, an air heater, a water heater, and a range;
wherein the air heater is a combustion heater that burns gas stored within the tank;
wherein the air heater heats the domestic chamber;
wherein the water heater is a combustion heater that burns gas stored within the gas tank to heat water that is drawn from the reservoir;
wherein the range is a combustion heater that is used to cook food.

12. The recreational vehicle according to claim 11
wherein the air heater further comprises a first valve;
wherein the first valve is a valve that controls the flow of gas into the air heater;
wherein the water heater further comprises a second valve;
wherein the second valve is a valve that controls the flow of gas into the water heater;
wherein the range further comprises a third valve and the first drawer;
wherein the range is stored within a first drawer such that the range may be accessed form the exterior of the domestic space;
wherein the third valve is a valve that controls the flow of gas into the range.

13. The recreational vehicle according to claim 12
wherein the reservoir is to a water storage device;
wherein the reservoir further comprises a hot line and a cold line;
wherein the reservoir is associated with a sink, a shower, a toilet, and a waste water tank;
wherein the hot line and the cold line interconnect the reservoir, the sink, the shower, and the toilet;
wherein the waste water tank is connected to the sink, the shower, and the toilet.

14. The recreational vehicle according to claim 13
wherein the hot line is a piping network that distributes water from the water heater to the sink and the shower;
wherein the water heater heats water flowing from the reservoir into the hot line;
wherein the cold line is a piping network that distributes water from the reservoir to the sink, the shower, and the toilet.

15. The recreational vehicle according to claim 14
wherein the sink is a basin;
wherein the sink further comprises a fourth valve, a fifth valve, and a second drawer;
wherein the second drawer is a drawer that contains the sink;
wherein the fourth valve is a valve that controls the flow of water from the water heater into the sink;
wherein the fifth valve is a valve that controls the flow of water from the reservoir into the sink.

16. The recreational vehicle according to claim 15
wherein the shower is a dedicated space within the domestic chamber;
wherein the shower further comprises a sixth valve and a seventh valve;
wherein the sixth valve is a valve that controls the flow of water from the water heater into the shower;
wherein the seventh valve is a valve that controls the flow of water from the reservoir into the shower.

17. The recreational vehicle according to claim 16
wherein the toilet is a receptacle into which biological excretions and eliminations are deposited;
wherein the toilet further comprises an eighth valve;
wherein the eighth valve is a valve that controls the flow of water from the reservoir into the toilet.

18. The recreational vehicle according to claim 17
wherein the waste water tank is a storage container;
wherein waste water generated by the sink, the shower, and the toilet is stored in the waste water tank;
wherein the waste water tank further comprises a discharge, a first check valve and a second check valve;
wherein the discharge is a port through which waste water collected within the waste water tank is removed;
wherein the first check valve is a valve that prevents the backflow of water from the waste water tank into the toilet;
wherein the second check valve is a valve that prevents the backflow of water from the waste water tank into both the sink and the shower.

19. The recreational vehicle according to claim 18
wherein the first pump pumps water from the reservoir through the cold line to the fourth valve of the sink and the seventh valve of the shower;
wherein the second pump pumps water from the reservoir through the water heater into the hot line which delivers the heated water to the fifth valve of the sink and the sixth valve of the shower;
wherein the third pump disposes of waste water that has accumulated in the waste water tank;
wherein the third pump pumps waste water from the waste water tank through the discharge.

* * * * *